(12) United States Patent
Huh et al.

(10) Patent No.: US 9,749,133 B2
(45) Date of Patent: Aug. 29, 2017

(54) METHOD AND APPARATUS FOR SECURE COMMUNICATION AND DETERMINING SECRET INFORMATION

(71) Applicant: SAMSUNG ELECTRONICS CO., LTD., Suwon-si (KR)

(72) Inventors: Mi Suk Huh, Suwon-si (KR); Jong Bu Lim, Yongin-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 13/926,245

(22) Filed: Jun. 25, 2013

(65) Prior Publication Data

US 2013/0343541 A1  Dec. 26, 2013

(30) Foreign Application Priority Data

Jun. 26, 2012  (KR) .......................... 10-2012-0068556

(51) Int. Cl.
| | |
|---|---|
| *H04L 9/00* | (2006.01) |
| *H04L 9/12* | (2006.01) |
| *H04L 9/08* | (2006.01) |
| *H04K 1/00* | (2006.01) |

(52) U.S. Cl.
CPC ................. *H04L 9/12* (2013.01); *H04K 1/00* (2013.01); *H04L 9/0875* (2013.01)

(58) Field of Classification Search
CPC .......... H04L 9/00; H04L 9/0643; G06F 21/00
USPC .................. 380/47, 257, 262; 375/229, 267; 713/170; 455/422
See application file for complete search history.

(56) References Cited

U.S. PATENT DOCUMENTS

| | | | | |
|---|---|---|---|---|
| 5,341,426 A | * | 8/1994 | Barney | ...................... H04L 9/12 380/28 |
| 5,434,920 A | * | 7/1995 | Cox | ......................... H04K 1/00 379/243 |
| 5,987,139 A | * | 11/1999 | Bodin | .................... H04W 12/02 380/261 |
| 7,013,389 B1 | * | 3/2006 | Srivastava | ............ H04L 9/0822 713/163 |

(Continued)

FOREIGN PATENT DOCUMENTS

| | | |
|---|---|---|
| EP | 1 693 982 A2 | 8/2006 |
| KR | 10-2007-0106612 A | 11/2007 |

(Continued)

OTHER PUBLICATIONS

International Search Report mailed Sep. 27, 2013 in counterpart International Application No. PCT/KR2013/005625 (3 pages, in English).

(Continued)

*Primary Examiner* — Dede Zecher
*Assistant Examiner* — Viral Lakhia
(74) *Attorney, Agent, or Firm* — NSIP Law

(57) ABSTRACT

A method of secure communication in a transmitter, includes determining a method of generating a training sequence that is shared with a receiver. The method further includes generating the training sequence based on the method of generating the training sequence, and secret information. The method further includes communicating with the receiver based on channel information derived from the training sequence.

26 Claims, 6 Drawing Sheets

(56) References Cited

U.S. PATENT DOCUMENTS

| | | | |
|---|---|---|---|
| 7,085,248 B1* | 8/2006 | Holma | H04B 17/336 370/329 |
| 7,406,120 B1* | 7/2008 | Schmidt et al. | 375/229 |
| 7,434,054 B2* | 10/2008 | Zick | H04L 9/0841 380/47 |
| 7,489,719 B1 | 2/2009 | Giardina | |
| 7,752,430 B2* | 7/2010 | Dzung | H04K 1/00 713/151 |
| 7,853,795 B2* | 12/2010 | Dick | H04L 63/0428 380/229 |
| 7,890,757 B2* | 2/2011 | Sudhakar | 713/170 |
| 7,965,761 B2* | 6/2011 | Shattil | H04B 1/7174 375/147 |
| 7,990,842 B2* | 8/2011 | Trachewsky | H04L 27/2613 370/208 |
| 8,085,864 B2 | 12/2011 | Ponnampalam et al. | |
| 8,090,101 B2* | 1/2012 | Ye | H04L 63/061 380/44 |
| 8,316,237 B1* | 11/2012 | Felsher | H04L 9/0825 380/282 |
| 8,619,909 B2* | 12/2013 | McGehee | H04L 7/042 375/316 |
| 8,718,117 B2* | 5/2014 | Hiscock | H04B 1/713 375/130 |
| 8,954,034 B2* | 2/2015 | Lee | H04W 12/04 455/411 |
| 9,001,713 B2* | 4/2015 | Morioka | H04B 7/0617 370/277 |
| 9,084,234 B2* | 7/2015 | Kolbe | H04L 12/4633 |
| 2004/0062211 A1* | 4/2004 | Uhlik | H04W 52/58 370/278 |
| 2004/0221239 A1* | 11/2004 | Hachigian | G09B 7/02 715/762 |
| 2005/0055546 A1* | 3/2005 | Dzung | H04K 1/00 713/151 |
| 2006/0182191 A1* | 8/2006 | Darwood | H04L 5/0023 375/267 |
| 2006/0291656 A1* | 12/2006 | Dalmases | H04L 27/2613 380/268 |
| 2007/0135172 A1* | 6/2007 | Lysejko | H04B 7/0851 455/562.1 |
| 2007/0177729 A1* | 8/2007 | Reznik et al. | 380/44 |
| 2008/0085701 A1* | 4/2008 | Darwood et al. | 455/422.1 |
| 2009/0036114 A1 | 2/2009 | Mohebbi | |
| 2009/0041246 A1* | 2/2009 | Kitazoe | H04W 12/02 380/270 |
| 2009/0291686 A1* | 11/2009 | Alpert | H04W 36/0083 455/436 |
| 2009/0318091 A1 | 12/2009 | Wang et al. | |
| 2010/0050047 A1* | 2/2010 | Choi | H04L 1/0065 714/755 |
| 2010/0061439 A1* | 3/2010 | Tomlinson | H04B 3/60 375/232 |
| 2010/0091826 A1 | 4/2010 | Chen et al. | |
| 2011/0116628 A1* | 5/2011 | Wack et al. | 380/44 |
| 2011/0179278 A1* | 7/2011 | Kim | G06F 21/33 713/175 |
| 2011/0280188 A1* | 11/2011 | Jeon et al. | 370/328 |
| 2012/0106739 A1 | 5/2012 | Ly et al. | |
| 2012/0263299 A1* | 10/2012 | Akhavan-Toyserkani | H04L 9/12 380/255 |
| 2013/0071837 A1* | 3/2013 | Winters-Hilt | C12Q 1/6869 435/6.11 |
| 2013/0101121 A1* | 4/2013 | Nordholt et al. | 380/279 |
| 2013/0121320 A1* | 5/2013 | Vutukuri | H04J 11/0036 370/337 |
| 2013/0266078 A1* | 10/2013 | Deligiannis | H04N 19/00533 375/240.25 |
| 2013/0336482 A1* | 12/2013 | Waisbard et al. | 380/210 |
| 2015/0126157 A1* | 5/2015 | Lee | H04W 12/04 455/411 |

FOREIGN PATENT DOCUMENTS

| | | |
|---|---|---|
| KR | 10-2008-0089342 A | 10/2008 |
| KR | 10-2011-0084099 A | 7/2011 |

OTHER PUBLICATIONS

Extended European Search Report issued on Feb. 11, 2016, in counterpart European Application No. 13810794.1 (9 pages, in English).

* cited by examiner

METHOD AND APPARATUS FOR SECURE COMMUNICATION AND DETERMINING SECRET INFORMATION

CROSS-REFERENCE TO RELATED APPLICATION(S)

This application claims the benefit under 35 U.S.C. §119 (a) of Korean Patent Application No. 10-2012-0068556, filed on Jun. 26, 2012, in the Korean Intellectual Property Office, the entire disclosure of which is incorporated herein by reference of all purposes.

BACKGROUND

1. Field

The following description relates to a method and apparatus for secure communication and determining secret information.

2. Description of Related Art

In a wireless communication system, establishing secure communication between communication units is of paramount significance. The establishing of the secure communication may be achieved by exchanging a key that includes a user interaction, for example, a user inputting a passcode, such as a password or a personal identification number (PIN), in a single or dual communication unit.

A method of secure communication may include a method of data encryption. The method of the data encryption may include conducting an authentication and a key exchange, and protecting data using at least one set key. For example, after setting an encryption key, a transmitter may encrypt data of secure communication using the encryption key and an encryption method, and may transmit the encrypted data to a receiver. The receiver may decrypt the encrypted data to the original data using a decryption key and a decryption method. Provided that a third party is unaware of a decryption method and a decryption key, data transmitted between a transmitter and a receiver may be protected, even if the data is exposed.

Also, a system of secure communication may include a public key infrastructure (PKI). The system of the secure communication is complex, and encrypts data through a public key method and a digital signature. The public key includes an encryption key and a decryption key, and a user is authenticated through the digital certificate.

SUMMARY

In one general aspect, there is provided a method of secure communication in a transmitter, the method including determining a method of generating a training sequence that is shared with a receiver. The method further includes generating the training sequence based on the method of generating the training sequence, and secret information. The method further includes communicating with the receiver based on channel information derived from the training sequence.

In another general aspect, there is provided a method of determining secret information in a transmitter, the method including transmitting, to a receiver, a hash value of channel information in the transmitter. The method further includes receiving, from the receiver, a response corresponding to the hash value. The method further includes determining the secret information based on the channel information and the response.

In still another general aspect, there is provided a method of determining secret information in a receiver, the method including receiving, from a transmitter, a hash value of the transmitter. The method further includes transmitting, to the transmitter, a response corresponding to the received hash value based on a comparison of the received hash value and a hash value of channel information in the receiver. The method further includes determining secret information based on the channel information and the comparison.

In yet another general aspect, there is provided a transmitter that performs secure communication, the transmitter including an agreeing unit configured to determine a method of generating a training sequence that is shared with a receiver. The transmitter further includes a generating unit configured to generate the training sequence based on the method of generating the training sequence, and secret information. The transmitter further includes a communicating unit configured to communicate with the receiver based on channel information derived from the training sequence.

In still another general aspect, there is provided a transmitter that determines secret information, the transmitter including a communicating unit configured to transmit, to a receiver, a hash value of channel information in the transmitter, and receive, from the receiver, a response corresponding to the hash value. The transmitter further includes a determining unit configured to determine the secret information based on the channel information and the response.

Other features and aspects will be apparent from the following detailed description, the drawings, and the claims.

DETAILED DESCRIPTION

Figure 1:
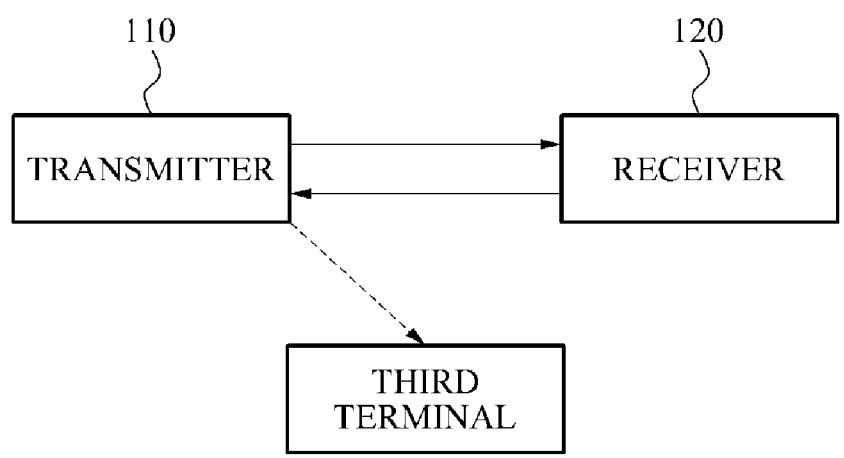
FIG. 1 is a diagram illustrating an example of a system that performs secure communication.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted of increased clarity and conciseness.

Throughout the drawings and the detailed description, the same reference numerals refer to the same elements. The drawings may not be to scale, and the relative size, proportions, and depiction of elements in the drawings may be exaggerated of clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a system that performs secure communication. Referring to FIG. 1, the system includes a transmitter 110 and a receiver 120. The system may include, for example, a cellular environment, a wireless network environment, and/or other environments known to one of ordinary skill in the art.

The transmitter 110 and the receiver 120 communicate with each other, using a predetermined secure channel (e.g., a wireless channel) in a physical layer. The transmitter 110 and the receiver 120 generate or determine secret information based on channel information shared between the transmitter 110 and the receiver 120. For example, the channel information may include gain information, amplitude information, information of an area occupied in a channel graph, and/or other physical information known to one of ordinary skill in the art, of the channel between the transmitter 110 and the receiver 120. The transmitter 110 and the receiver 120 may share the channel information with each other in advance, and/or the secure channel. In this example, the secret information may include a secret key that may be shared between the transmitter 110 and the receiver 120 in advance.

The transmitter 110 and the receiver 120 may generate the secret information to be unknown to a third terminal 130 between the transmitter 110 and the receiver 120, based on a physical property (e.g., the channel information shared between the transmitter 110 and the receiver 120) of the physical layer. The transmitter 110 and the receiver 120 may provide the generated secret information to an upper layer, and the upper layer may encrypt data of the upper layer based on the provided secret information.

Also, the transmitter 110 and the receiver 120 may be provided with the secret information. For example, the transmitter 110 and the receiver 120 may share the secret information with each other through the secure channel.

The transmitter 110 and the receiver 120 determine whether channel information of the transmitter 110 and channel information of the receiver 120 are equal to each other. For example, the transmitter 110 and the receiver 120 may determine whether the channel information of the transmitter 110 and the channel information of the receiver 120 are equal to each other based on respective hash values. In more detail, the transmitter 110 may quantize the channel information of the transmitter, and may map the quantized channel information to a hash value, using a hash function. In other words, the transmitter 110 may convert the channel information to an integer that represents the channel information in bits, and may match the converted channel information to the hash value, using the hash function. The hash function may refer to a function of generating a type of a short electronic fingerprint based on random data, and may generate the hash value by cutting, substituting, changing locations, and/or other operations known to one of ordinary skill in the art. The receiver 120 may perform similar operations as those of the transmitter 110.

In this example, the receiver 120 may receive the hash value of the channel information in the transmitter 110, and may compare the hash value of the channel information in the transmitter 110 to a hash value of the channel information in the receiver 120. When the hash value of the channel information in the transmitter 110 is determined to be equal to the hash value of the channel information in the receiver 120, the receiver 120 determines that the channel information of the transmitter 110 and the channel information of the receiver 120 are equal to each other. When the hash value of the channel information in the transmitter 110 is determined to differ from the hash value of the channel information in the receiver 120, the receiver 120 changes the channel information in the receiver 120 based on a predetermined method, and maps the changed channel information to a new hash value to be transmitted to the transmitter 110. The transmitter 110 may perform similar operations as those of the receiver 120.

In this example, when the transmitter 110 receives the new hash value from the receiver 120, the transmitter 110 may change the channel information of the transmitter 110 based on the predetermined method, map the changed channel information to a new hash value, and compare the new hash value mapped by the transmitter 110 to the new hash value received from the receiver 120. The receiver 120 may perform similar operations as those of the transmitter 110.

The transmitter 110 and the receiver 120 may perform such a process repeatedly until the hash value of the channel information in the transmitter 110 is equal to the hash value of the channel information in the receiver 120, which indicates that the channel information of the transmitter 110 and the channel information of the receiver 120 are equal to each other. When the channel information of the transmitter 110 and the channel information of the receiver 120 are determined to be equal to each other, the transmitter 110 and the receiver 120 may transmit, to each other, a response indicating that the hash value of the channel information in the transmitter 110 is equal to the hash value of the channel information in the receiver 120. In this example, the transmitter 110 and the receiver 120 determine the secret information based on (e.g., to be) the channel information shared between the transmitter 110 and the receiver 120. The above process will be described with reference to FIGS. 5 and 6.

The transmitter 110 and the receiver 120 determine (e.g., agree on) a method of generating a unique training sequence, prior to generating respective unique training sequences. In wireless communication, the unique training sequence may include, for example, a pilot, a reference, or a preamble that is used to share channel information. The transmitter 110 and the receiver 120 may exchange or synchronize the determined method of generating a unique training sequence with each other.

When the secret information is determined by the transmitter 110 and the receiver 120, respectively, the transmitter 110 and the receiver 120 may match (e.g., set to be equal) the secret information of the transmitter 110 to the secret information of the receiver 120, prior to the determining of the method of generating the unique training sequence. Conversely, when the secret information is shared between the transmitter 110 and the receiver 120 prior to the determining of the method of generating the unique training sequence, the matching of the secret information may be unnecessary. The transmitter 110 and the receiver 120 may determine (e.g., agree on) secret information among the secret information determined by the transmitter 110 and the receiver 120, to be used to generate a unique training sequence.

The transmitter 110 and the receiver 120 generate the respective unique training sequences that are equal to each other based on the secret information determined by the transmitter 110 and the receiver 120, the determined method of generating a unique training sequence, and a public training sequence. The public training sequence may include a pilot, a reference, or a preamble that is used in a wireless communication environment and shared between terminals including the transmitter 110 and the receiver 120 prior to the generating of the unique training sequences. For example, the transmitter 110 and the receiver 120 may generate the respective unique training sequences by inputting the secret information and the public training sequence in a function.

The transmitter 110 and the receiver 120 may share or exchange the respective generated unique training sequences with each other, e.g., through the secure channel. For example, the transmitter 110 may transmit, to the receiver 120, the unique training sequence generated by the transmitter 110, e.g., through the secure channel. In response, the receiver 120 may transmit, to the transmitter 110, a confirmation of safe receipt of the unique training sequence generated by the transmitter 110.

The transmitter 110 and the receiver 120 perform secure communication with each other based on the respective generated unique training sequences, using a new channel in the physical layer. The above process will be described with reference to FIG. 4. For example, since the transmitter 110 and the receiver 120 use the respective generative unique training sequences unknown to the third terminal 130, the third terminal 130 may not create a channel, or obtain channel information, between the transmitter 110 and the third terminal 130, and between the receiver 120 and the third terminal 130. Accordingly, the transmitter 110 and the receiver 120 may prevent communication content between the transmitter 110 and the receiver 120 from being exposed to the third terminal 130, by not exposing, e.g., a packet header to the third terminal 130.

Further, by generating the respective unique training sequences based on the secret information determined by the transmitter 110 and the receiver 120, the transmitter 110 and the receiver 120 may perform the secure communication with each other, without an additional encryption process based on the secret information. Also, since the transmitter 110 and the receiver 120 may not have to perform an additional encryption process, a communication environment between the transmitter 110 and the receiver 120 may be improved, and an amount of energy expended during a communication process between the transmitter 110 and the receiver 120 may be reduced. If an additional encryption process is performed based on the secret information, the secret information may be used to protect a channel in the physical layer, and to perform secure communication in the upper layer.

In another example, each of the transmitter 110 and the receiver 120 may change an order of data included in the public training sequence based on the secure information, and may generate the unique training sequence further based on the changed order of the data included in the public training sequence. For example, each of the transmitter 110 and the receiver 120 may shuffle the data included in the public training sequence, and may generate the unique training sequence further based on the shuffled data.

For example, each of the transmitter 110 and the receiver 120 may change an order of data included in a public training sequence $L_{-26.26}=\{1, 1, \ldots, -1, \ldots, 1\}$ defined in Institute of Electrical and Electronics Engineers (IEEE) 802.11a, and may generate the unique training sequence further based on the changed order of the data included in the public training sequence. In this example, each of the transmitter 110 and the receiver 120 may generate $2^{52}$ different unique training sequences based on the public training sequence and secret information that includes 52 bits of data as included in the public training sequence. If the generated unique training sequence is inappropriate for a communication environment, each of the transmitter 110 and the receiver 120 may re-generate the unique training sequence.

In still another example, each of the transmitter 110 and the receiver 120 may extract the data from the public training sequence selectively, and may generate the unique training sequence further based on the extracted data. In yet another example, each of the transmitter 110 and the receiver 120 may combine data of the secret information and the data of the public training sequence, and may generate the unique training sequence further based on the combination. In still another example, each of the transmitter 110 and the receiver 120 may generate the unique training sequence further based on index information of the public training sequence.

Since the unique training sequence is used as a secret value between the transmitter 110 and the receiver 120, the transmitter 110 and the receiver 120 may prevent the third terminal 130 from generating a channel equal to a new channel generated by the transmitter 110 and the receiver 120 using the unique training sequence. Accordingly, the transmitter 110 may prevent the third terminal 130 from obtaining communication content between the transmitter 110 and the receiver 120 that is communicated based on the unique training sequence.

Each of the transmitter 110 and the receiver 120 derives new channel information between the transmitter 110 and the receiver 120 based on the generated unique training sequence. The transmitter 110 and the receiver 120 perform the secure communication with each other based on the derived new channel information, using the new channel in the physical layer. When the secret information is determined by and shared between the transmitter 110 and the receiver 120, the new channel information derived by the transmitter 110 may be equal to the new channel information derived by the receiver 120.

When the secure communication is unnecessary between the transmitter 110 and the receiver 120, the transmitter 110 and the receiver 120 performs communication based on channel information derived from the public training sequence. That is, the transmitter 110 and the receiver 120 may perform the secure communication only in a section requiring the secure communication.

Figure 2:
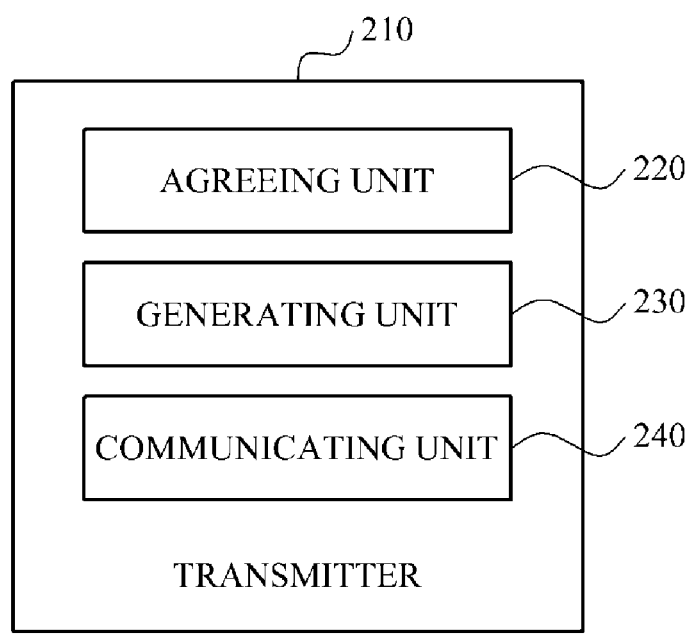
FIG. 2 is a diagram illustrating an example of a transmitter that performs secure communication.

FIG. 2 is a diagram illustrating an example of a transmitter 210 that performs secure communication. Referring to FIG. 2, the transmitter 210 includes an agreeing unit 220, a generating unit 230, and a communicating unit 240.

The agreeing unit 220 determines (e.g., agrees, with a receiver, on) a method of generating a unique training sequence based on secret information included in the agreeing unit 220. This determination may include determining an agreement between the transmitter 210 and the receiver on the secure communication as a whole. For example, the agreeing unit 220 may further determine (e.g., agree on) secret information among secret information included in the transmitter 210 and the receiver, to be used to generate a unique training sequence. Accordingly, the transmitter 210 and the receiver generate respective unique training sequences based on the secret information included in the transmitter 210 and the receiver, the determined method of generating a unique training sequence, and a public training sequence. When the transmitter 210 and the receiver determine the secret information included in the transmitter 210 and the receiver, respectively, the transmitter 210 and the receiver may match (e.g., set to be equal) the secret information included in the transmitter 210 to the secret information included in the receiver, prior to the determining of the method of generating the unique training sequence.

The generating unit 230 generates the unique training sequence based on the secret information included in the agreeing unit 220, the determined method of generating a unique training sequence, and the public training sequence. In wireless communication, the unique training sequence may include, for example, a pilot, a reference, or a preamble. Accordingly, the transmitter 210 performs the secure communication with the receiver based on the generated unique training sequence.

For example, the generating unit 230 may change an order of data included in the public training sequence, and may generate the unique training sequence based on the changed order of the data included in the public training sequence. In another example, the generating unit 230 may extract the data from the public training sequence selectively, may generate the unique training sequence based on the extracted data. In still another example, the generating unit 230 may combine data included in the secret information and the data included in the public training sequence, and may generate the unique training sequence based on the combination.

The communicating unit 240 communicates with the receiver based on the generated unique training sequence. In more detail, the communicating unit 240 performs the secure communication with the receiver based on new channel information between the transmitter 210 and the receiver that is derived from the generated unique training sequence.

When the secure communication is unnecessary between the transmitter 210 and the receiver, the communicating unit 240 may communicate with the receiver based on the public training sequence, namely, the channel information derived from the public training sequence. That is, the transmitter 210 and the receiver may perform the secure communication only in a section requiring the secure communication.

Figure 3:
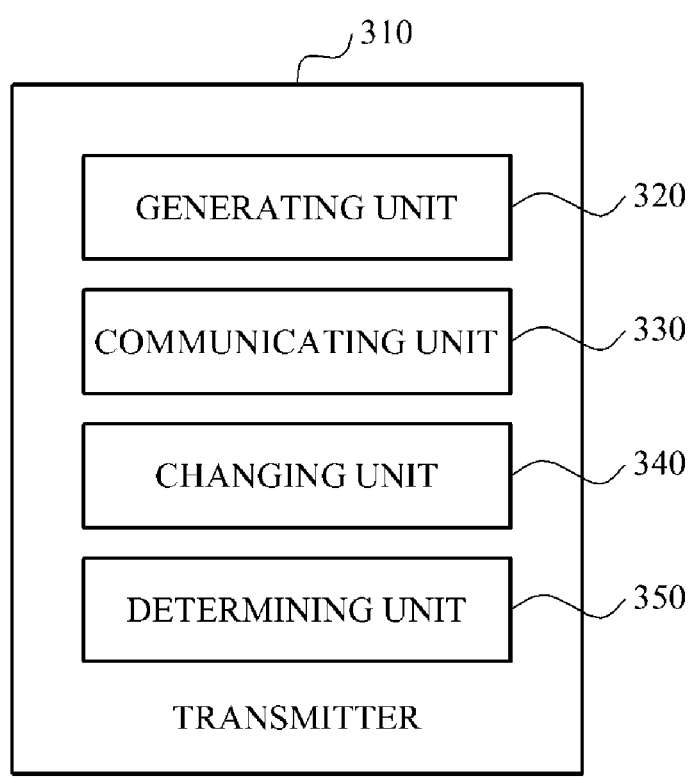
FIG. 3 is a diagram illustrating an example of a transmitter that determines secret information.

FIG. 3 is a diagram illustrating an example of a transmitter 310 that determines secret information. Referring to FIG. 3, the transmitter 310 includes a generating unit 320, a communicating unit 330, a changing unit 340, and a determining unit 350.

The generating unit 320 generates channel information of the transmitter 310 in a form of a hash value. In more detail, the generating unit 320 may quantize the channel information, and may map the quantized channel information to the hash value, using a hash function. In other words, the generating unit 320 may convert the channel information to an integer in bits, and may apply the converted channel information in the hash function to generate the hash value. When the changing unit 340 changes the channel information, the generating unit 320 applies the changed channel information in the hash function to generate a new hash value.

The communicating unit 330 transmits, to a receiver, the generated hash value. Further, the communicating unit 330 receives, from the receiver, a response corresponding to the hash value. The response may indicate whether the transmitted hash value of the transmitter 310 is equal to a hash value (of channel information) of the receiver, or may include the hash value of the receiver. If the communicating unit 330 receives, from the receiver, the hash value of the receiver, the communicating unit 330 may recognize that the transmitted hash value of the transmitter 310 differs from the hash value of the receiver, despite an absence of the response indicating whether the transmitted hash value of the transmitter 310 is equal to the hash value of the receiver.

The changing unit 340 also receives, from the receiver, the response corresponding to the hash value. If the changing unit 340 receives the response indicating that the transmitted hash value of the transmitter 310 differs from the hash value of the receiver, the changing unit 340 changes the channel information of the transmitter 310 based on a predetermined method. For example, the predetermined method may include a method of dividing the channel information, a method of generating a data section of a predetermined location in a form of new channel information, and/or other methods known to one of ordinary skill in the art. The generating unit 320 may generate the new hash value based on the changed channel information.

If the changing unit 340 receives the response indicating that the transmitted hash value of the transmitter 310 differs from the hash value of the receiver, the changing unit 340 may change a predetermined length among a total length of data of the channel information of the transmitter 310. For example, if the changing unit 340 receives the response indicating that the transmitted hash value of the transmitter 310 differs from the hash value of the receiver, the changing unit 340 may cut the predetermined length among the total length of the data of the channel information of the transmitter 310. The generating unit 320 may generate the new hash value based on a remainder of the cut channel information of the transmitter 310.

The determining unit 350 also receives, from the receiver, the response corresponding to the hash value, and determines the secret information based on the channel information of the transmitter 310 and the response. For example, when the determining unit 350 receives the response indicating that the transmitted hash value of the transmitter 310 is equal to the hash value of the receiver, the determining unit 350 determines the secret information to be the channel information of the transmitter 310. In this example, the determining unit 350 may determine the secret information to be the channel information quantized by the generating unit 320.

If the generating unit 320 generates the new hash value based on the changed channel information of the transmitter 310, and the response includes the hash value of the receiver, the determining unit 350 determines whether the new hash value is equal to the hash value of the receiver. If the new hash value is equal to the hash value of the receiver, the determining unit 350 determines the secret information to be the changed channel information of the transmitter 310.

Figure 4:
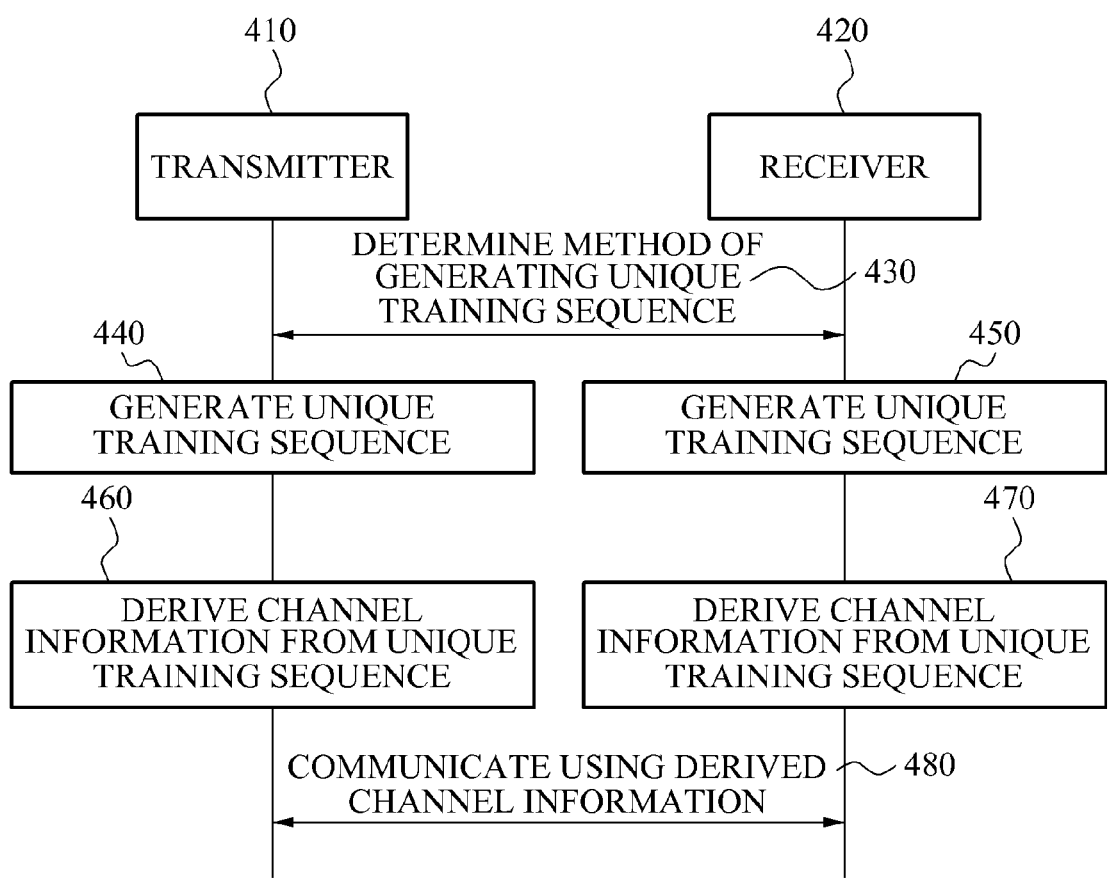
FIG. 4 is a flowchart illustrating an example of a method of performing secure communication in a transmitter and a receiver.

FIG. 4 is a flowchart illustrating an example of a method of performing secure communication in a transmitter 410 and a receiver 420. In operation 430, the transmitter 410 and the receiver 420 determine (e.g., agree on) a method of generating a unique training sequence. The transmitter 410 and the receiver 420 may further determine (e.g., agree on) secret information, among secret information included in the transmitter 410 and the receiver 420, to be used to generate a unique training sequence. The transmitter 410 and the receiver 420 may further share the secret information with each other in advance. The transmitter 410 and the receiver 420 may further generate or determine the secret information of the transmitter 410 and the receiver 420, respectively, and may match (e.g., set to be equal) the secret information of the transmitter 410 to the secret information of the receiver 420.

In operations 440 and 450, the transmitter 410 and the receiver 420 generate respective unique training sequences based on the secret information of the transmitter 410 and the receiver 420, the determined method of generating a unique training sequence, and a public training sequence. The unique training sequence may include, for example, a pilot, a reference, or a preamble. The transmitter 410 and the receiver 420 may further change an order of data included in the public training sequence, or may extract the data from the public training sequence selectively, to generate the unique training sequence. The transmitter 410 and the receiver 420 may further combine data included in the secret information and the data included in the public training sequence, to generate the unique training sequence. The transmitter 410 and the receiver 420 may further input the secret information and the public training sequence in a function, to generate the unique training sequence. When the secret information of the transmitter 410 is matched or equal to the secret information of the receiver 420, the transmitter 410 and the receiver 420 generate the respective unique training sequences that are matched or equal to each other.

The transmitter 410 and the receiver 420 may share or exchange the respective generated unique training sequences with each other, e.g., through a secure channel. For example, the transmitter 410 may transmit, to the receiver 420, the unique training sequence generated by the transmitter 410, e.g., through the secure channel. In response, the receiver 420 may transmit, to the transmitter 410, a confirmation of safe receipt of the unique training sequence generated by the transmitter 410.

In operations 460 and 470, each of the transmitter 410 and the receiver 420 derives channel information from the generated unique training sequence. When the unique training sequence of the transmitter 410 is matched or equal to the unique training sequence of the receiver 420, the transmitter 410 and the receiver 420 generate the respective channel information that are matched or equal to each other.

In operation 480, the transmitter 410 and the receiver 420 communicate with each other, using the derived channel information, and a new channel in a physical layer. For example, the transmitter 410 and the receiver 420 may further form the new channel, using the unique training sequence, and exchange data with each other through the new channel. When the secure communication between the transmitter 410 and the receiver 420 is unnecessary, the transmitter 410 and the receiver 420 communicate with each other based on channel information derived from the public training sequence.

Figure 5:
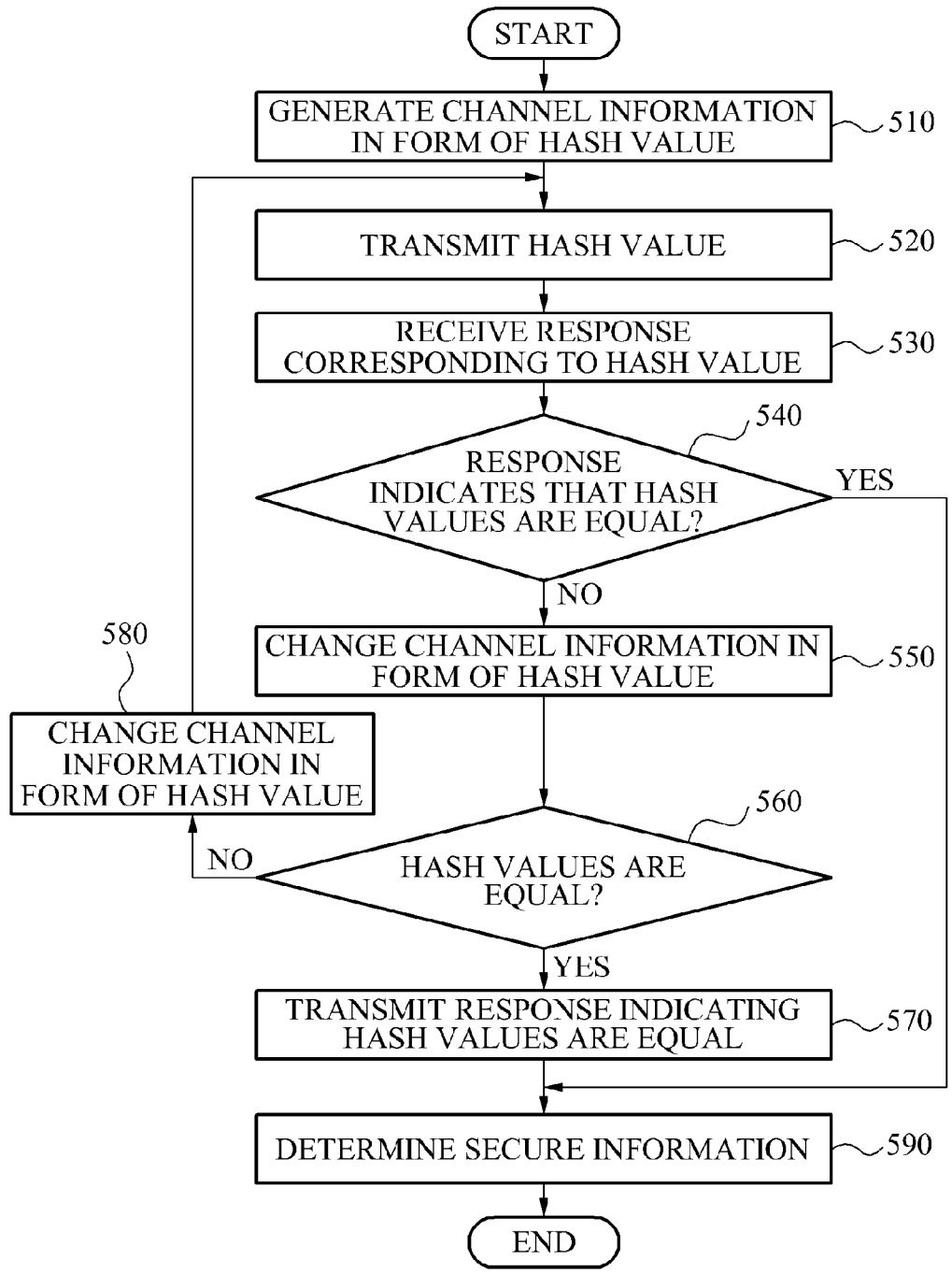
FIG. 5 is a flowchart illustrating an example of a method of determining secret information in a transmitter.

FIG. 5 is a flowchart illustrating an example of a method of determining secret information in a transmitter. In operation 510, the transmitter generates channel information in a form of a hash value. The transmitter may further quantize the channel information, and generate the quantized channel information in the form of the hash value.

In operation 520, the transmitter transmits the generated hash value to the receiver. If the channel information of the transmitter changes, the transmitter may further re-generate the hash value based on the changed channel information, and transmit the re-generated hash value to the receiver.

In operation 530, the transmitter receives a response corresponding to the transmitted hash value from the receiver. For example, the response may indicate whether the transmitted hash value of the transmitter is equal to a hash value (of channel information) of the receiver, or may include the hash value of the receiver. If the transmitter receives the hash value of the receiver, the transmitter may further recognize that the transmitted hash value of the transmitter differs from the hash value of the receiver, despite an absence of the response indicating whether the transmitted hash value of the transmitter is equal to the hash value of the receiver.

In operation 540, the transmitter determines whether the response indicates that the transmitted hash value of the transmitter is equal to the hash value of the receiver. If the response indicates that the transmitted hash value of the transmitter is equal to the hash value of the receiver, the method continues in operation 550. Otherwise, the method continues in operation 590.

In operation 550, the transmitter changes the channel information of the transmitter in a form of the hash value based on a predetermined method. For example, the predetermined method may include a method of dividing the channel information, a method of generating a data section of a predetermined location in a form of new channel information, and/or other methods known to one of ordinary skill in the art.

In operation 560, the transmitter determines whether the changed hash value of the transmitter is equal to the hash value of the receiver. If the changed hash value of the transmitter is equal to the hash value of the receiver, the method continues in operation 570. Otherwise, the method continues in operation 580.

In operation 570, the transmitter transmits, to the receiver, a response indicating that the changed hash value of the transmitter is equal to the hash value of the receiver.

In operation 580, the transmitter re-changes the channel information of the transmitter in a form of the hash value based on the predetermined method. The method returns to operation 520.

In operation 590, the transmitter determines the secret information based on the channel information of the transmitter. The transmitter may determine that the channel information or the changed channel information, of the transmitter, is the secret information. The transmitter may further determine that the quantized channel information of the transmitter is the secret information. Since an order in which such operations are performed may not be limited to those suggested in operations 570 and 590, operation 590 may be performed prior to operation 570, or may be performed simultaneously.

As such, the transmitter may match (e.g., set to be equal) the channel information of the transmitter to the channel information shared by the receiver by repeating a process of generating the channel information of the transmitter in the form of the hash value, and changing the channel information of the transmitter in the form of the hash value until the hash value of the transmitter is determined to be equal to the hash value of the receiver.

Figure 6:
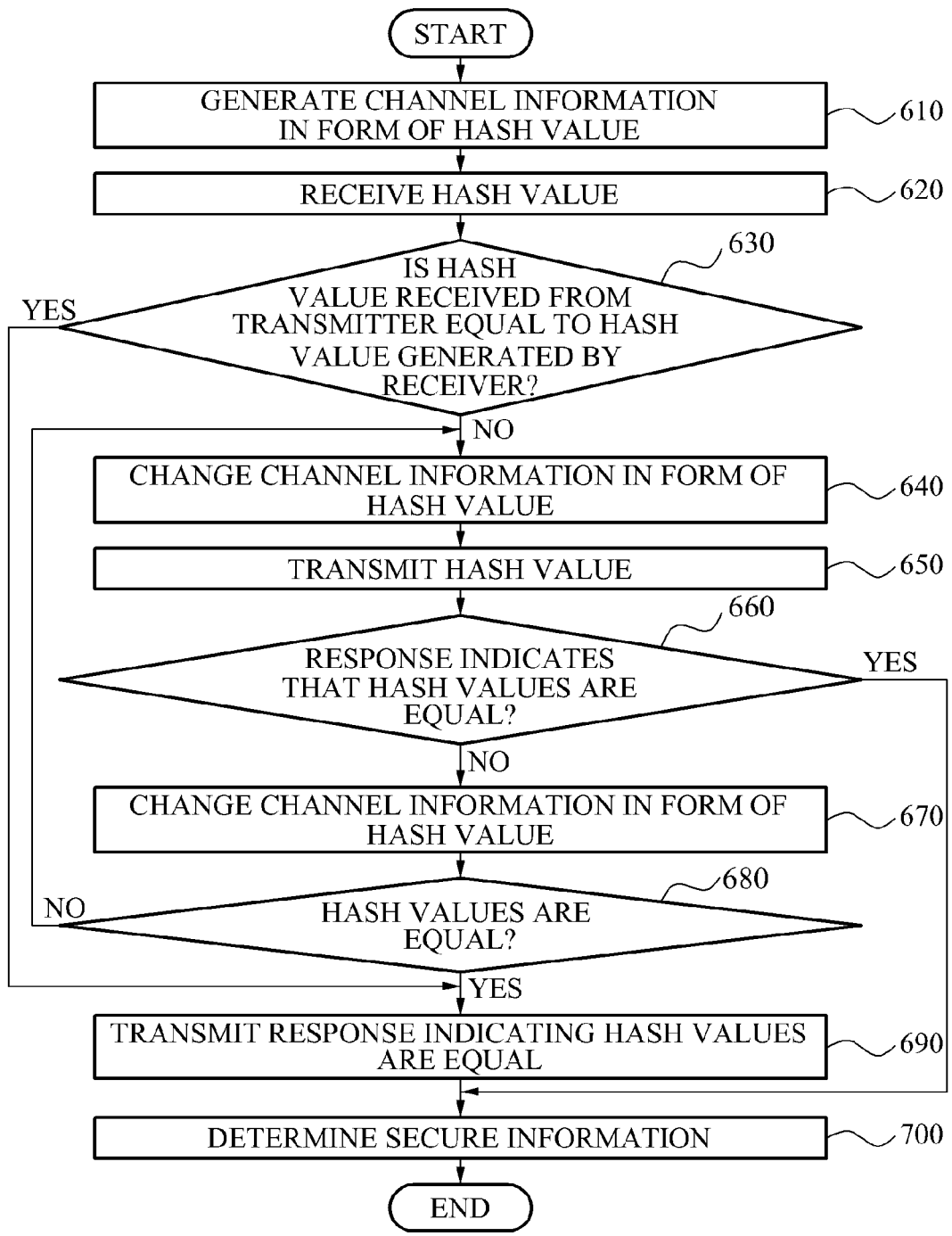
FIG. 6 is a flowchart illustrating an example of a method of determining secret information in a receiver.

FIG. 6 is a flowchart illustrating an example of a method of determining secret information in a receiver. In operation 610, the receiver generates channel information in a form of a hash value. The receiver may further quantize the channel information, and generate the quantized channel information in the form of the hash value.

In operation 620, the receiver receives, from a transmitter, a hash value to which channel information of the transmitter is applied. Since an order in which such operations are performed may not be limited to those suggested in operations 610 and 620, operation 620 may be performed prior to operation 610, or may be performed simultaneously.

In operation 630, the receiver determines whether the hash value received from the transmitter is equal to the hash value generated by the receiver. If the hash value received from the transmitter is not equal to the hash value generated by the receiver, the method continues in operation 640. Otherwise, the method continues in operation 690.

In operation 640, the receiver changes the channel information of the receiver based on a predetermined method, and re-generates the hash value based on the changed channel information. For example, the receiver may change (e.g., cut) a predetermined length among a total length of data of the channel information to change the channel information, and may re-generate the hash value based on the changed channel information applied in a hash function.

In operation 650, the receiver transmits, to the transmitter, the re-generated hash value. The receiver may further transmit, together with the re-generated hash value, a response indicating that the hash value received from the transmitter is equal to, or differs from, the hash value re-generated by the receiver.

In operation 660, the receiver receives, from the transmitter, a response corresponding to the transmitted hash value, and determines whether the response indicates that the hash value of the transmitter is equal to the hash value transmitted by the receiver. If the response indicates that the hash value of the transmitter is not equal to the hash value transmitted by the receiver, the method continues in operation 670. Otherwise, the method continues in operation 700.

In operation 670, the receiver changes the channel information of the receiver based on the predetermined method, and re-generates the hash value based on the changed channel information.

In operation 680, the receiver determines whether the hash value received from the transmitter is equal to the hash value re-generated by the receiver. If the hash value received from the transmitter is equal to the hash value re-generated by the receiver, the method continues in operation 690. Otherwise, the method returns to operation 640.

In operation 690, the receiver transmits, to the transmitter, a response indicating that the hash value received from the transmitter is equal to the hash value generated or re-generated by the receiver.

In operation 700, the receiver determines the secret information based on the channel information of the receiver. The receiver may further determine the channel information or the changed channel information, of the receiver, to be secret information. The receiver may further determine the quantized channel information to be the secret information. Since an order in which such operations are performed may not be limited to those suggested in operations 660 and 670, operation 670 may be performed prior to operation 660, or may be performed simultaneously.

As such, the receiver may match (e.g., set to be equal) the channel information of the receiver to the channel information shared by the transmitter by repeating a process of generating the channel information of the receiver in the form of the hash value, and changing the channel information of the receiver in the form of the hash value until the hash value of the receiver is determined to be equal to the hash value of the transmitter.

The various units and methods described above may be implemented using one or more hardware components, one or more software components, or a combination of one or more hardware components and one or more software components.

A hardware component may be, of example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, of example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, of example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, of example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that controls a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments of implementing the examples disclosed herein can be easily constructed by a programmer skilled in the art to which the examples pertain based on the drawings and their corresponding descriptions as provided herein.

As a non-exhaustive illustration only, a terminal described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not of purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of secure communication in a transmitter, the method comprising:
   determining whether secure communication between the transmitter and a receiver is necessary;
   generating a unique training sequence based on secret information and a public training sequence, and
   communicating securely with the receiver using the unique training sequence, in response to determining that secure communication between the transmitter and the receiver is necessary; and
   communicating with the receiver using the public training sequence shared between the transmitter and the receiver, in response to determining that secure communication is unnecessary.

2. The method of claim 1, wherein the generating of the unique training sequence comprises:
   changing an order of data of the public training sequence based on the secure communication.

3. The method of claim 1, wherein the generating of the unique training sequence comprises:
   extracting data from the public training sequence selectively based on the secure communication.

4. The method of claim 1, wherein the generating of the unique training sequence comprises:
   combining data of the secret information and data of the public training sequence.

5. The method of claim 1, further comprising:
   determining the secret information such that the secret information between the transmitter and the receiver is equal each other.

6. A non-transitory computer-readable medium embodying a program executable in a computer device with memory, wherein the executed program, when executed, causes the computer device with memory to perform the method of determining whether secure communication between the transmitter and a receiver is necessary;
   generating a unique training sequence based on secret information and a public training sequence, and communicating securely with the receiver using the unique training sequence, in response to determining that secure communication between the transmitter and the receiver is necessary; and
   communicating with the receiver using the public training sequence shared between the transmitter and the receiver, in response to determining that secure communication is unnecessary.

7. A method of determining secret information of a transmitter, the method comprising:
   transmitting, to a receiver, a hash value generated based on channel information;
   receiving, from the receiver, a first response corresponding to the hash value;
   changing the channel information of the transmitter such that a hash value of the transmitter generated based on the changed channel information is equal to a hash value of the receiver, in response to the transmitted hash value differing from the hash value of the receiver; and
   determining the secret information based on the changed channel information.

8. The method of claim 7, further comprising:
   transmitting, to the receiver, a hash value generated based on the changed channel information; and
   receiving, from the receiver, a second response corresponding to the hash value generated based on the changed channel information.

9. The method of claim 8, wherein the determining comprises determining the secret information based on the changed channel information in response to the second response indicating that the hash value generated based on the changed channel information is equal to a hash value of the receiver.

10. The method of claim 7, wherein the changing comprises changing a predetermined length of data of the channel information.

11. The method of claim 7, further comprising:
quantizing the channel information; and
generating the hash value based on the quantized channel information.

12. The method of claim 7, further comprising:
generate a unique training sequence based on the secret information.

13. A method of determining secret information in a receiver, the method comprising:
receiving, from a transmitter, a hash value of the transmitter;
transmitting, to the transmitter, a first response corresponding to the hash value of the transmitter;
changing channel information of the receiver such that a hash value of the receiver generated based on the changed information is equal to a hash value of the transmitter in response to the received hash value differing from the hash value of the receiver; and
determining the secret information based on the changed channel information.

14. The method of claim 13, wherein the determining comprises determining the secret information based on the changed channel information in response to the second response indicating that the hash value generated based on the changed channel information is equal to a hash value of the receiver.

15. The method of claim 13, wherein the changing comprises changing a predetermined length of data of the channel information.

16. The method of claim 13, further comprising:
transmitting, to the transmitter, a hash value generated based on the changed channel information
receiving, from the transmitter, a second response corresponding to the transmitted hash value.

17. A transmitter that performs secure communication, the transmitter comprising:
at least one hardware processor; and
a communicating unit configured to communicate with a receiver,
wherein the at least one processor determines whether secure communication between the transmitter and the receiver is necessary, and generates a unique training sequence based on secret information and a public training sequence, and communicating securely with the receiver using the unique training sequence, in response to determining that secure communication between the transmitter and the receiver is necessary; and
wherein the communicating unit communicates with the receiver using the public training sequence shared between the transmitter and the receiver, in response to determining that secure communication is unnecessary.

18. The transmitter of claim 17, wherein the at least one processor changes an order of data of the public training sequence based on the secure communication to generate the unique training sequence.

19. The transmitter of claim 17, wherein the at least one processor extracts data from the public training sequence selectively based on the secure communication to generate the unique training sequence.

20. The transmitter of claim 17, wherein the at least one processor combines data of the secret information and data of the public training sequence to generate the unique training sequence.

21. The transmitter of claim 17, wherein the at least one processor generate $2^X$ unique training sequences, and wherein x is a number of bits of data in the public training sequence.

22. The transmitter of claim 17, wherein the at least one processor generates the unique training sequence based on index information of the public training sequence.

23. A transmitter comprising:
at least one hardware processor; and
a communicating unit configured to communicate with a receiver,
wherein the communicating unit transmits, to a receiver, a hash value generated based on channel information, and receives, from the receiver, a first response corresponding to the hash value of the transmitter,
wherein the at least one processor changes the channel information of the transmitter such that a hash value of the transmitter generated based on the changed channel information is equal to a hash value of the receiver, in response to the transmitted hash value differing from the hash value of the receiver, and determines the secret information based on the changed channel information.

24. The transmitter of claim 23, wherein the communicating unit transmits, to the receiver, a hash value generated based on the changed channel information, and receives, from the receiver, a second response corresponding to the hash value generated based on the changed channel information.

25. The transmitter of claim 23, wherein the at least one processor determines the secret information based on the changed channel information in response to the second response indicating that the hash value generated based on the changed channel information is equal to a hash value of the receiver.

26. The transmitter of claim 23, wherein the changing of the channel information comprises changing a predetermined length of data of the channel information.

* * * * *